US012119136B2

(12) United States Patent
Uegaki et al.

(10) Patent No.: US 12,119,136 B2
(45) Date of Patent: Oct. 15, 2024

(54) SHIELDED COMMUNICATION CABLE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Ryoma Uegaki, Yokkaichi (JP); Kinji Taguchi, Yokkaichi (JP); Takaki Endo, Yokkaichi (JP); Tatsuya Shimada, Yokkaichi (JP); Toru Shimizu, Yokkaichi (JP); Yuta Yasuyoshi, Yokkaichi (JP); Kenichiro Iwama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 448 days.

(21) Appl. No.: 17/438,268

(22) PCT Filed: Jan. 23, 2020

(86) PCT No.: PCT/JP2020/002204

§ 371 (c)(1),
(2) Date: Sep. 10, 2021

(87) PCT Pub. No.: WO2020/183925

PCT Pub. Date: Sep. 17, 2020

(65) Prior Publication Data

US 2022/0189660 A1 Jun. 16, 2022

(30) Foreign Application Priority Data

Mar. 13, 2019 (JP) ................................ 2019-046146

(51) Int. Cl.
*H01B 11/10* (2006.01)

(52) U.S. Cl.
CPC ................................ *H01B 11/1033* (2013.01)

(58) Field of Classification Search
CPC ...... H01B 11/06; H01B 11/1033; H01B 7/18; H01B 11/10
(Continued)

(56) References Cited

U.S. PATENT DOCUMENTS 4,491,939 A * 1/1985 Carpenter ............. G01V 1/201 174/101.5
10,446,293 B2 10/2019 Uegaki et al.
(Continued)

FOREIGN PATENT DOCUMENTS

CN 1371516 A 9/2002
JP H04-24226 U 2/1992
(Continued)

OTHER PUBLICATIONS

Permittivity and Dielectric Constant k_from EESemi_p. 1_2005.*
(Continued)

*Primary Examiner* — Timothy J Thompson
*Assistant Examiner* — Guillermo J Egoavil
(74) *Attorney, Agent, or Firm* — Oliff PLC

(57) ABSTRACT

A shielded communication cable. The shielded communication cable includes a pair of insulated wires twisted with each other containing a conductor and an insulation covering which covers the conductor and has the relative dielectric constant of 2.5 or lower, a braided shield which covers the pair of insulated wires, a film-shaped shield which contains a metal film and longitudinally laps the pair of the insulated wires over the braided shield and a jacket having an inner diameter of 3.5 mm or smaller which covers the film-shaped shield. The pair of insulated wires are twisted with each
(Continued)

other with a twist pitch of 30 times of an outer diameter of each of the insulated wires or smaller, and the shielded communication cable has a characteristic impedance in range of 100±5Ω.

11 Claims, 1 Drawing Sheet

(58) Field of Classification Search
USPC .......................................................... 174/34
See application file for complete search history.

(56) References Cited

U.S. PATENT DOCUMENTS

| | | | |
|---|---|---|---|
| 10,818,415 | B2 | 10/2020 | Uegaki et al. |
| 2004/0026101 | A1 | 2/2004 | Ochi |
| 2006/0048966 | A1 | 3/2006 | Takahashi et al. |
| 2015/0075838 | A1 | 3/2015 | Buck et al. |
| 2019/0013116 | A1 | 1/2019 | Uegaki et al. |
| 2019/0341171 | A1 | 11/2019 | Uegaki et al. |

FOREIGN PATENT DOCUMENTS

| | | | | |
|---|---|---|---|---|
| JP | H0741053 | Y2 * | 9/1995 | ............. H01B 11/06 |
| JP | 2001-195924 | A | 7/2001 | |
| JP | 2002-289047 | A | 10/2002 | |
| JP | 2005-032583 | A | 2/2005 | |
| JP | 2008-287948 | A | 11/2008 | |
| JP | 2010-287355 | A | 12/2010 | |
| JP | 2016-533021 | A | 10/2016 | |
| JP | 2017-183178 | A | 10/2017 | |
| WO | 01/08167 | A1 | 2/2001 | |
| WO | 2004/013869 | A1 | 2/2004 | |
| WO | 2017/168815 | A1 | 10/2017 | |
| WO | WO-2018096854 | A1 * | 5/2018 | ............. H01B 11/00 |
| WO | WO-2018120058 | A1 * | 7/2018 | ............. H01B 11/06 |
| WO | WO-2019058437 | A1 * | 3/2019 | ............. H01B 11/00 |

OTHER PUBLICATIONS

Aug. 3, 2022 Office Action issued in Chinese Patent Application No. 202080017253.3.
Apr. 14, 2020 International Search Report issued in International Patent Application No. PCT/JP2020/002204.
Apr. 10, 2023 Office Action issued in Chinese Patent Application No. 202080017253.3.

* cited by examiner

SHIELDED COMMUNICATION CABLE

TECHNICAL FIELD

The present invention relates to a shielded communication cable.

BACKGROUND ART

Demanding for high-speed communication is increasing in field of such as automobiles. As a communication cable used for high-speed communication, for example, Patent Document 1 discloses a two-core parallel shielded cable in which two cables with insulators on each inner conductor are arranged in parallel, an outer conductor made of a metal braided shield having a prescribed braided pitch covers these two strips of cables. Patent Document 1 also discloses a form having an outer conductor with a two-layer structure by providing a metal tape layer further surrounding the metal braided layer.

CITATION LIST

Patent Literature

Patent Literature 1: JP 2001-195924 A
Patent Literature 2: JP 2005-032583 A
Patent Literature 3: JP 2016-533021 A
Patent Literature 4: JP 2010-287355 A
Patent Literature 5: JP 2002-289047 A
Patent Literature 6: JP 2008-287948 A
Patent Literature 7: JP 2017-183178 A
Patent Literature 8: JP H04-24226 A

SUMMARY OF INVENTION

Technical Problem

When the communication cable is used in a limited place such as an automobile, bending is usually applied to a communication cable in placing cables. In particular, when the communication cables are placed where movement is performed, such as automobile doors, the communication cables are subject to repeated bending. In that case, it is required that communication cables maintain a high level of noise shielding even after being subjected to bending.

As described in Patent Document 1, when a communication cable has a two-layer shield consisting of an outer conductor made of a metal braided layer and a metal tape layer around the signal line, the performance of noise shielding can be improved. However, as described in Patent Document 1, two-core parallel cables, which consist of two wires disposed in parallel, have low performance of bending resistance, and thus the high performance of noise shielding owing to two types of the shield may not be maintained sufficiently when bending is applied to the cable. For example, in a two-core parallel cable, since the flexibility of the cable is low with respect to bending in the direction in which the two insulated wires disposed in parallel, excessive load is applied to the shielding layer, and especially the metal tape layer, and thus the shield may be damaged. Furthermore, if the cable is applied to repeated bending, the distance between the two insulated wires may not be kept constant, and the required characteristic impedance may not be maintained.

In view of above problems, it is an object of the present disclosure to provide a shielded communication cable having excellent performance of bending resistance.

Solution to Problem

A shielded communication cable according to the present disclosure includes a pair of insulated wires twisted with each other containing a conductor and an insulation covering which covers the conductor and has the relative dielectric constant of 2.5 or lower, a braided shield which covers the pair of insulated wires, a film-shaped shield which contains a metal film and longitudinally laps the pair of the insulated wires over the braided shield and a jacket having an inner diameter of 3.5 mm or smaller which covers the film-shaped shield. The pair of insulated wires are twisted with each other with a twist pitch of 30 times of an outer diameter of each of the insulated wires or smaller, and the shielded communication cable has a characteristic impedance in range of 100±5Ω.

Advantageous Effects of Invention

The shielded communication cable according to the present disclosure has excellent performance of bending resistance.

DESCRIPTION OF EMBODIMENTS

Figure 1:
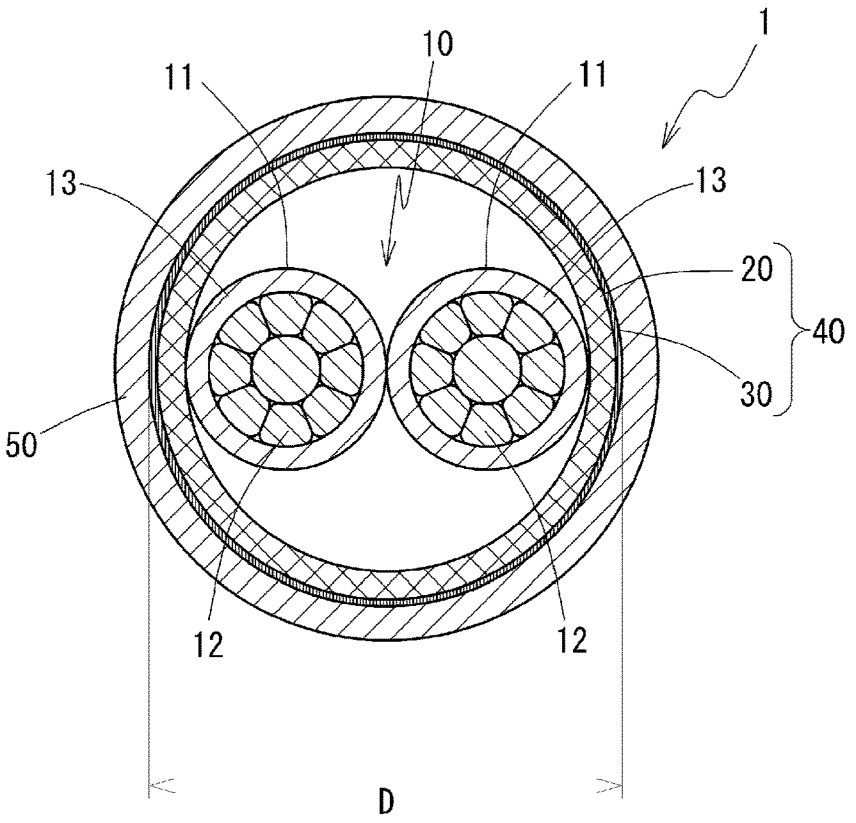
FIG. 1 is a cross-sectional view showing a configuration of a shielded communication cable according to an embodiment of the present invention.

Description of Embodiments of the Present Invention

First, a description of embodiments of the present invention will now be provided.

A shielded communication cable according to the present disclosure includes a pair of insulated wires twisted with each other containing a conductor and an insulation covering which covers the conductor and has the relative dielectric constant of 2.5 or lower, a braided shield which covers the pair of insulated wires, a film-shaped shield which contains a metal film and longitudinally laps the pair of the insulated wires over the braided shield and a jacket having an inner diameter of 3.5 mm or smaller which covers the film-shaped shield. The pair of insulated wires are twisted with each other with a twist pitch of 30 times of an outer diameter of each of the insulated wires or smaller, and the shielded communication cable has a characteristic impedance in range of 100±5Ω).

In the shielded communication cable as described above, when the braided shield and the film-shaped shield placed longitudinally are stacked and cover the twisted pair that contains the pair of insulated wires twisted with each other, the shielded communication cable can have excellent performance of noise shielding. Further, since the twisted pair containing the pair of insulated wires twisted with each other is used as a signal line, using the twisted pair contains the pair of insulated wires twisted with each other, the signal line can have high flexibility in bending at each direction.

Thus, when the shield communication cable is bent, the film-shaped shield is less likely to be overloaded. Further, when the pair of insulated are twisted with each other with the twist pitch of 30 times of the outer diameter of the insulated wires or smaller, the characteristic impedance is less likely to change from the range of 100±5Ω even if the shielded communication cable is repeatedly bent. In addition, when the jacket has an inner diameter of 3.5 mm or smaller, an outer diameter of a shape of cylinder formed by the film-shaped shield placed longitudinally can be small, and the film-shaped shield can hardly be damaged even if the shielded communication cable is bent. These effects can provide the shielded communication cable having excellent performance of bending resistance. In order for the inner diameter of the jacket to be 3.5 mm or smaller, the insulation covering must be thin and the diameter of the insulated wire must be reduced. However, when the relative dielectric constant of the insulation covering is 2.5 or lower, the insulation covering has an excellent effect of maintaining the characteristic impedance at a required high value, and it is easy to keep the characteristic impedance in the range of 100±5Ω) and the inner diameter of the jacket 3.5 mm or smaller even if the thickness of the insulation covering is reduced.

Here, in the shielded communication cable according to the present disclosure, it is preferable that the outer diameter of the insulated wire is 1.5 mm or smaller. When the outer diameter of the insulated wire is 1.5 mm or smaller, the inner diameter of the jacket can be 3.5 mm or smaller easily, and the shielded communication cable can easily obtain excellent bending resistance.

In addition, it is preferable that the conductor cross-sectional area of the insulated wire is 0.22 $mm^2$ or smaller. By keeping the conductor cross-sectional area of the insulated wire small and reducing the diameter of the conductor, even if the insulation covering is thinner, the decrease of the characteristic impedance of the shielded communication cable is suppressed and it is easy to maintain the characteristic impedance in the range of 100±5Ω. Due to both the effect of reducing the cross-sectional area of the conductor and the effect of thinning the insulation covering, the diameter of the insulated wire is reduced, and the inner diameter of the jacket of the shielded communication cable is easily suppressed to 3.5 mm or smaller.

On the other hand, it is preferable that the conductor cross-sectional area of the insulated wire is 0.13 $mm^2$ or larger. Then, the insertion loss of the shielded communication cable is suppressed to a low level, and good transmission characteristics can be easily obtained.

It is preferable that the film-shaped shield has a composite structure in which a polymer film and a metal film are stacked with each other. The polymer film enhances the mechanical strength of the film-shaped shield and easily increase the performance of bending resistance of the shielded communication cable. Further, by using the polymer film, a jacket can be easily adhering to the outer of the film-shaped shield.

It is preferable that the jacket is adhere to the film-shaped shield. Then, in a terminal of the shielded communication cable, the film-shaped shield can be integrally removed with the jacket. As a result, in processing of the shielded communication cable, both the jacket and the film shield can be removed in a single process and the processability of the shielded communication cables can be improved.

Details of Embodiments of Disclosure

A detailed description of a shielded communication cable according to a preferred embodiment of the present invention will now be provided with reference to drawings. In the present specification, every material property that depends on measuring frequency and/or measuring condition, such as relative dielectric constant or characteristic impedance, is defined with respect to a communication frequency at which the communication cable is used, for example, in the range of 300 KHz to 1 GHz, and is measured at room temperature in air unless otherwise specified.

(Overall Configuration of the Shielded Communication Cable)

FIG. 1 shows a cross-sectional view of the shielded communication cable 1 according to an embodiment of the present disclosure. The shielded communication cable 1 contains a twisted pair 10 that contains a pair of the insulated wires 11,11 twisted with each other. Each of the insulated wires 11 contains a conductor 12 and an insulation covering 13 which covers the conductor 12.

The shielded communication cable 1 contains a shielding body 40 on the outer periphery of the twisted pair 10. The shielding body 40 may cover a bundle of a plurality of twisted pairs 10 collectively, however, it is preferable that the shielding body 40 continuously covers only one twisted pair 10.

The shield body 40 consists of a braided shield 20 and the film-shaped shield 30, which are stacked, with the braided shield 20 on the inner side and the film shield 30 on the outer side. The braided shield 20 covers the pair of the insulated wires 11, 11, in other words, the outer periphery of the twisted pair 10.

The film-shaped shield 30 covers the braided shield 20. From the viewpoint of improving the performance of noise shielding, it is preferable that the film-shaped shield 30 is directly contact with the surface of the braided shield 20 with metal surface without any materials between the braided shield 20 and the film-shaped shield 30. The film-shaped shield 30 longitudinally laps the pair of the insulated wires 11, 11, in other words, the twisted pair 10. Thus, with the axis direction of the twisted pair 10 and longitudinal axis of the surface of the elongated film-shaped shield 30 are aligned, the surface of the film-shaped shield 30 covers the twisted pair 10 along the peripheral direction of the twisted pair 10.

Further, the shielded communication cable 1 contains a jacket (a sheath) 50 which is made of the insulated materials and covers the film-shaped shield 30. The jacket 50 is in contact with the surface of the film-shaped shield 30 either directly or through a thin layer of an adhesive. It is preferable that no material other than the adhesive is interposed between the jacket 50 and the file-shaped shield 30. The inner diameter D of the jacket 50 is 3.5 mm or smaller. The inner diameter D of the jacket 50, in the cross-section perpendicular to the axial direction of the shielded communication cable 1, is defined as the length of the longest straight line among the straight lines connecting the points facing each other on the inner periphery of the jacket 50 through the center of the gravity of the region surrounded by the outer edge of the shielded communication cable 1.

The shielded communication cable 1 has the characteristic impedance defined by materials or size of each component. The shielded communication cable 1 according to the present embodiment has the characteristic impedance in the range of 100±5Ω. Each of the constructional materials of the shielded communication cable 1 will now be described.

(Construction of the Twisted Pair)

The shielded communication cable 1 has the twisted pair 10 in which the pair of insulated wires 11, 11 are twisted with each other as a signal line for transmitting an electric signal. Each of the insulated wires 11 has the conductor 12 and the insulation covering 13 which covers the conductor 12. In the shielded communication cable 1 according to the present disclosure, configuration material constituting the insulation covering 13 has the relative dielectric constant of 2.5 or lower. Further, the twist pitch of the twisted pair 10 is 30 times of the outer diameter of each of the insulated wires 11 or smaller. The material and configuration parameter of each part of the twisted pair 10 is not particularly limited, but preferable embodiments will be described.

(1) Configuration of the Insulated Wire

It is preferable that each of the insulated wires 11 which constitutes the twisted pair 10 has the outer diameter of 1.5 mm or smaller. By reducing the outer diameter of each of the insulated wires 11, the outer diameter of the twisted pair 10 in which the pair of insulated wires 11 are twisted with each other can be reduced, and the outer diameter of the assembly in which the twisted pair 10 is surrounded by the shielding body 40 and the inner diameter D of the jacket 50 placed at the outside of the assembly can be reduced. When the outer diameter of the insulated wire 11 is 1.5 mm or smaller, the inner diameter of the jacket 50 can be easily suppressed to 3.5 mm or smaller. From the viewpoint of further reducing the inner diameter D of the jacket 50, the outer diameter of the insulated wire 11 is more preferably 1.3 mm or smaller. The smaller the diameter of the insulated wire 11, the easier it is to keep the inner diameter D of the jacket 50 small. Therefore, no lower limit of the outer diameter of the insulated wire 11 is set.

[1-1] Insulation Covering

The insulation covering 13 constituting each of the insulated wires 11 is made of an insulated material including a polymer material and has the relative dielectric constant of 2.5 or lower as mentioned above. The specific material constituting the insulation covering 13 is not particularly limited as long as the relative dielectric constant of 2.5 or lower is obtained.

As the polymer material constituting the insulation covering 13, it is preferable to use a material having low molecular polarity, particularly a non-polar material. Examples of such low-polarity or non-polar polymer materials include polyolefins such as polyethylene and polypropylene, polystyrene, and polytetrafluoroethylene. Among these, it is preferable to use polyolefin, especially polypropylene. The aforementioned polymer materials may be used in combination, or as long as the upper limit of the relative permittivity is not exceeded, the aforementioned polymer material and a polymer material not listed above may be used in combination. The polymer material constituting the insulation covering 13 may be crosslinked or foamed. Foaming can reduce the relative dielectric constant of the insulating covering 13. Further, the insulation covering 13 may contain additives such as a flame retardant in addition to the polymer material as necessary. However, the relative dielectric constant of the insulation covering 13 is defined with respect to the entire insulation covering material including the additive.

The more the material with a low relative dielectric constant is contained in the insulation covering 13, the higher the characteristic impedance of the shielded communication cable 1. On the other hand, the smaller the thickness of the insulation covering 13, the lower the characteristic impedance of the shielded communication cable 1. Thus, by using the material with a low relative dielectric constant as the insulation covering 13, even if the thickness of the insulation covering 13 is reduced and the diameter of the insulated wire 11 and the twisted pair 10 are reduced, the characteristic impedance of the shielded communication cable 1 can be kept at a value that is not too low and the specified characteristic impedance can be secured. If the relative dielectric constant of the insulation covering 13 is 2.5 or lower, it is easy to reduce the outer diameter of the insulated wire 11 to 1.5 mm or smaller and the inner diameter D of the jacket 50 to 3.5 mm or smaller with the characteristic impedance maintained in the range of 100±5Ω. Although there is no specific lower limit for the relative dielectric constant, the relative dielectric constant of polymer materials which can be practically used to constitute the insulation covering 13 of the insulated wires 11 is generally 1.3 or higher.

The thickness of the insulation covering 13 should be selected appropriately to allow the outer diameter of the insulated wire 11 to be 1.5 mm or smaller, for example, while maintaining the characteristic impedance of the shielded communication cable 1 at 100±5Ω by taking into account the relative dielectric constant of the material constituting the insulation covering 13, the conductor cross-sectional area of the insulated wire 11, etc. Suitably, the thickness of the insulation covering 13 should be 0.50 mm or smaller, or even 0.40 mm or smaller. On the other hand, if the insulation covering 13 is made too thin, it may be difficult to secure the required high characteristic impedance, so it is preferable that the thickness of the insulation covering 13 should be 0.20 mm or larger.

(1-2) Conductor

The conductor 12 can be made of metal materials such as copper alloy. The conductor cross-sectional area of each of the insulated wires 11, i.e., the cross-sectional area of the conductor 12 (nominal cross-sectional area; the same applies hereinafter) is preferably 0.22 $mm^2$ or smaller. When the cross-sectional area of the conductor of the insulated wire 11 is reduced and the conductor 12 is made thinner, the distance between the two conductors 12, 12 that constitute the twisted pair 10 (the distance between the centers of the conductors 12, 12) becomes closer, and the characteristic impedance of the shielded communication cable 1 becomes higher. As described above, the thinner the insulation covering 13 which covers the conductor 12, the lower the characteristic impedance of the shielded communication cable 1 becomes. However, by keeping the conductor cross-sectional area of each of the insulated wires 11 as small as 0.22 $mm^2$, it becomes easier to keep the outer diameter of each insulated wire 11 to be 1.5 mm or smaller due to the effects of both the thinning of the diameter of the conductor 12 itself and the thinning of the insulated wire 11, while ensuring the impedance of 100±5Ω required for the shielded communication cable 1.

On the other hand, the conductor cross-sectional area of each insulated wire 11 is preferably 0.13 $mm^2$ or larger. This is because if the cross-sectional area of the conductor is 0.13 $mm^2$ or larger, it is possible to prevent the characteristic impedance of the shielded communication cable 1 from becoming lower than the range of 100±5Ω due to excessive reduction of the diameter of the conductor 12, and also to keep the insertion loss (transmission loss) low. If the conductor cross-sectional area is too small, the insertion loss becomes large due to electric resistance of the conductor 12. When the conductor cross-sectional area of each insulated wire 11 is 0.13 $mm^2$ or larger, however, the insertion loss can be suppressed low and obtained excellent transmission characteristics even if the shielded communication cable 1 is routed over a long distance such as a length of 10 m or longer, for example.

Specific metal materials constituting the conductor 12 of each insulated wire 11 are not particularly limited. However, it is preferable that the conductor 12 has a breaking elongation of 7% or higher. The higher the conductor 12 has the breaking elongation, the more stable the twisted structure of the twisted pair 10 can be maintained and the loosening of the twisted structure can be effectively suppressed. Especially, in the shielded communication cable 1 according to the present embodiment, the braided shield 20 directly covers the twisted pair 10 and the shielded communication cable 1 have no tape or other material on the outer periphery of the twisted pair 10 to hold the twist structure of the twisted pair without loosening. However, when the conductor 12 has the breaking elongation of 7% or higher, as explained next, in combination with the effect of keeping the twist pitch of the twisted pair 10 30 times of the outer diameter of the insulated wire 11 or smaller, loosening of the twisting structure of the twisted pair 10 is less likely to occur. Furthermore, it may be easier to maintain the twist structure of the twisted pair 10 without loosening even if the shielded communication cable 1 is repeatedly bent. As a result, in the shielded communication cable 1, stable transmission characteristic can be obtained. As copper alloy wires having the breaking elongation of 7% or higher, the first and second copper alloy wires having the following ingredients composition can be provided as examples.

The first copper alloy wire has the following ingredients composition and a balance being Cu and unavoidable impurities:

Fe: 0.05 mass % or more and 2.0 mass % or less;

Ti: 0.02 mass % or more and 1.0 mass % or less; and

Mg: 0 mass % or more and 0.6 mass % or less (including a case where Mg is not contained in the alloy).

The second copper alloy wire has the following ingredients composition and a balance being Cu and unavoidable impurities:

Fe: 0.1 mass % or more and 0.8 mass % or less

P: 0.03 mass % or more and 0.3 mass % or less

Sn: 0.1 mass % or more and 0.4 mass % or less

The conductor 12 may consist of single wire; however, the conductor 12 is preferably formed as strand wires containing a plurality of elemental wires (e.g., seven elemental wires) stranded together from the viewpoint of improving flexibility when the conductor 12 is bent. In this case, the conductor 12 may be compressed strands formed by compression of strand wires after stranding of the elemental wires. Further, when the conductor 12 consists of elemental wires, the conductor 12 may consist of single type of elemental wires or two or more types of elemental wires.

(2) Twist Structure of the Twisted Pair

The twisted pair 10 is made by twisting two insulated wires 11, with each other. As described above, the twist pitch in twisting with each other is 30 times of the outer diameter of each of the insulated wires or smaller.

In the shielded communication cable, if the two insulated wires 11, 11 disposed in parallel without being twisted are used as the signal line as described in Patent Document 1, the signal line may be bent in the direction intersecting the two insulated wires 11, 11 with relative smoothness. If the signal line is bent in the direction along the line of the two insulated wires 11,11, however, the signal line shows less flexibility. If an attempt is made to bend the shielded communication cable in a direction in which the cable shows less flexibility in bending, bending may cause a large load on the components of the shielded communication cable, including the film-shaped shield 30. A large load on the film-shaped shield 30 may cause breakage or other damage to the film-shaped shield 30. Further, if the signal line with the two insulated wires 11,11 disposed in parallel is used, the distance between the two insulated wires 11, 11 may become large as they are repeatedly subjected to bending. As a result, it may be impossible to maintain the specific transmission characteristics. For example, if the distance between the two insulated wires increases, the characteristic impedance may become excessively high and deviate from the predetermined range to a high value.

In contrast, in the shielded communication cable 1, by using the twisted pair 10 containing the two insulated wires 11, 11 twisted with each other, as the signal line, it becomes easier to bend the signal lines in each circumferential direction of the signal line. As a result, when the shielded communication cable 1 is bent, a large load hardly applies to each component of the shielded communication cable 1, including the film-shaped shield 30. By reducing the load applied to the film-shaped shield 30, the film-shaped shield 30 is less likely to be damaged including breaking, even when the shielded communication cable 1 is bent, and it becomes easier to maintain the noise shielding performance of the film-shaped shield 30. Further, by twisting the two insulated wires 11, 11 with each other, the twist structure can preserve the relative position of the two insulated wires 11, 11 and the transmission characteristic can be maintained stably even when the shielded communication cable 1 is repeatedly subject to bent. The characteristic impedance can also be kept in the range of 100±5Ω) easily. Therefore, using the twisted pair 10 as the signal line can provide excellent performance of bending resistance for the shielded communication cable 1 in terms of both avoiding damage to the components in bending and maintaining of the specified transmission characteristics.

In the twisted pair 10, the smaller the twist pitch at which the pair of insulated wires 11, 11 are twisted with each other, the easier it is to suppress loosening of the twisted structure of the twisted pair 10. The smaller the twist pitch, the loosening of the twisted structure due to bending of the shielded communication cable 1 can be suppressed. Therefore, the transmission characteristics of the shielded communication cable 1, including the characteristic impedance, can be maintained stably before and after the shielded communication cable 1 is bent. In the shielded communication cable 1 according to the present embodiment, the braided shield 20 directly covers the twisted pair and the shielded communication cable 1 has no tape or other material to hold the twist structure of the twisted pair 10. When the twist pitch of the twisted pair 10 is 30 times of the outer diameter of the insulated wire 11 or smaller, however, loosening of the twist structure can be effectively suppressed and the characteristic impedance can be maintained in range of 100±5Ω easily in repeated bending of the shielded communication cable 1. From the viewpoint of surely maintaining the twist structure, the twist pitch of the twisted pair 10 is preferably 25 times of the outer diameter of the insulated wire 11 or lower, and more preferably 20 times or lower.

The lower limit of the twist pitch of the twisted pair 10 is not particularly defined from the viewpoint of the transmission characteristics of the shielded communication cable 1, however, from the viewpoint of the productivity of the twisted pair 10 and stability of transmission characteristics against change of the twist pitch, the lower limit of the twist pitch of the twisted pair 10 is preferably eight times of the outer diameter of the insulated wire 11 or larger, and more preferably 12 times or larger. When the outer diameter of the insulated wire 11 is 1.5 mm or smaller, the twist pitch of the twisted pair 10 expressed in the absolute value should be roughly preferably 35 mm or smaller and more preferably 25 mm or smaller. On the other hand, the absolute value of the twist pitch should be 10 mm or larger and 15 mm or larger.

In the twisted pair 10, for the twist structure of the two insulated wires 11, 11, it is preferable that no twisting around the twist axis is applied to each of the insulated wire 11. In this case, the relative vertical and horizontal directions of each part of the insulated wire 11, when viewed from the center of the axis of the insulated wire 11 itself, do not change along the twist axis. In other words, a portion having the same distance from the center of the axis of the insulated wire 11 always faces the same direction, such as upward, in the entire twist structure. Since the insulated wire 11 is not twisted, in the one pitch of the twist pitch, the change in the distance between the two insulated wires 11, 11 is small, and the instability of the transmission characteristics caused by the change in the distance between the two insulated wires 11, 11 in the axial direction of the shielded communication cable 1 can be suppressed.

(Structure of the Shielding Body)

As described above, the shielded communication cable 1 according to the present embodiment has the shielding body 40 around the twisted pair 10 consisting of the braided shield 20 and the film-shaped shield 30 which are stacked in this order from the inside. The film-shaped shield 30 longitudinally laps the twisted pair 10.

The braided shield 20 constituting the shielding body 40 is thin metal elemental wires braided into the shape of a hollow cylinder. The elemental wires are made of a metal material such as copper, a copper alloy, aluminum, or an aluminum alloy, or a material having a plated layer such as tin on the surface of the metal material. The braided shield 20 plays a role of shielding the intrusion of noise from outside and stopping noises released from the twisted pair 10 to the outside.

The film-shaped shield 30 constituting the shielding body 40 is film-shaped material having a metal film, and it plays a role of shielding the intrusion of noise from outside and emission of noise to outside. The film-shaped shield 30 can be of any type as long as it has the metal film and can be either a form of the single metal film (a metal foil), or a form of the composite material of the metal film and another material, such as a base material. Preferable examples of the composite material can include a polymer-metal composite film 30A as described in FIG. 2, in which a polymer film 31 as the base material and a metal film 32 are combined by evaporation, plating, and adhering. By compositing the metal film 32 with the polymer film 31, the mechanical strength and handleability of the whole film-shaped shield 30 can be improved compared with the case where the metal film is used alone. When the mechanical strength of the film-shaped shield 30 increases, the film-shaped shield 30 can be less likely to be damaged such as breakage where the shielded communication cable 1 is bent, and thus the bending resistance of the shielded communication cable 1 can be improved.

Although specific metal species contained in the film-shaped shield 30 as the single metal film or the metal film in the composite material are not particularly limited, examples of metal species can include metal materials such as copper, copper alloys, aluminum, and aluminum alloys. The metal film may be a film formed by a single metal species, or layered films formed by two or more types of metal species in combination. Further, materials other than metal, such as protective films made of organic materials, may be placed on the surface of the metal film where necessary as long as the materials do not interfere with noise shielding characteristics of the film-shaped shield 30.

When the film-shaped shield 30 are made of the polymer-metal composite film 30A, examples of polymer species contained in the polymer film 31 can include polyester resin such as polyethylene terephthalate (PET), polyolefin resin such as polypropylene, and vinyl resin such as polyvinyl chloride. Further, the polymer film 31 may contain additives and other materials in addition to various polymer species where necessary. As the polymer species, from the viewpoint of excellent mechanical strength and flexibility, PET can be particularly preferable, and AI-PET film, which is the polymer-metal composite film 30A formed by combining an aluminum film with PET film, can be particularly suitable for use as the film-shaped shield 30.

In the polymer-metal composite film 30A, from the viewpoint of ensuring mechanical strength and handleability of the whole film-shaped shield 30 sufficiently, the thickness of the polymer film 31 should be at least greater than the thickness of the metal film 32, and in particular, the thickness should be preferably 10 μm or larger. On the other hand, from the viewpoint of ensuring small diameters and flexibility of the shielded communication cable 1, the thickness of the whole polymer-metal film 30A should be preferably 500 μm or smaller, and more preferably 100 μm or smaller. Further, from the viewpoint of providing sufficient noise shielding, the thickness of the metal film 32 constituting the polymer-metal composite film 30A should be preferably 1 μm or larger. On the other hand, from the viewpoint of ensuring flexibility, the thickness of the metal film 32 should be preferably 30 μm or smaller. The metal film 32 can be provided on one or both sides of the polymer film 31. However, when the film-shaped shield 30 is to be bonded to the jacket 50 as described below, as described in FIG. 2, it is preferable to provide the metal film 32 on only one side of the polymer film 31 and an adhesive layer 33 made of adhesive on the other side.

Figure 2:
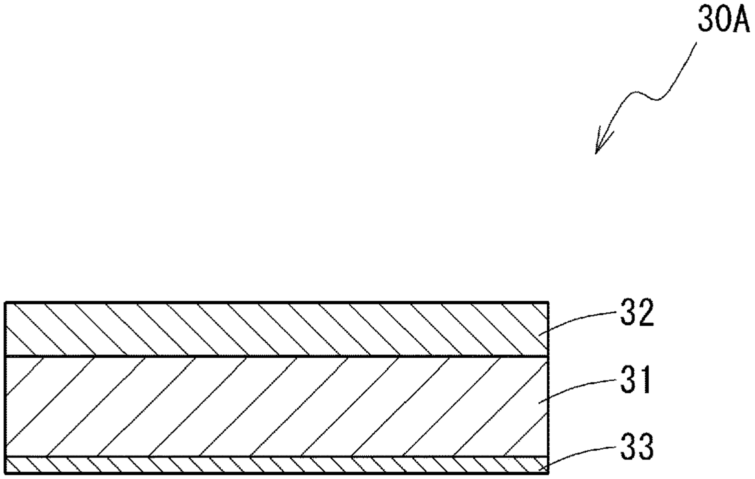
FIG. 2 is a cross-sectional view showing a configuration of a film-shaped shield used in the shielded communication cable according to an embodiment of the present invention.

The shielded communication cable 1 have two types of shielding materials as the shielding body 40: the braided shield 20 and the film-shaped shield 30 stacked with each other around the twisted pair 10. By providing two types of shielding materials, the volume of a conductive material surrounding the twisted pair 10 become large, and a higher noise shielding effect can be achieved compared with the case where one type of shielding material is used. Therefore, the intrusion from the outside and emission to the outside of noise can be effectively shielded. Furthermore, in the shielded communication cable 1 according to the present embodiment, the braided shield 20 is placed at an inner position and the film-shaped shield 30 is placed at an outer position in the shielding body 40. When the film-shaped shield 30 is formed as a composite of the metal film 32 and the base material 31 that is made of other material than the metal film as the polymer-metal film 30A, as illustrated in FIG. 2, it is preferable that the surface of the metal film 30 of the shielding body 40 having a stacking structure faces inward to have direct contact with the braided shield 20. With this arrangement, the metal film 32 may directly contact elements constituting the braided shield 20, and thus the noise shielding property of the shielding boy 40 is improved effectively.

In the shielded communication cable 1 according to the present embodiment, the film-shaped shield 30 longitudinally laps the twisted pair 10. The film-shaped shield 30 is placed on the outer periphery of the braided shield 20 along the peripheral direction of the twisted pair 10, so that the film-shaped shield 30 can lap the outer periphery of the composite of the twisted pair 10 and the braided shield 20 on the surface of the film-shaped shield 30. The film-shaped shield 30 lapping the composite of the twisted pair 10 and the braided shield 20 is overlapped with each other at both ends and appropriately adhere to each other. As a result, the film-shaped shield 30 can cover the composite with no gaps. Since the film-shaped shield 30 longitudinally laps the twisted pair 10, it is easier to arrange the film-shaped shield 30 than where the film-shaped shield 30 horizontally laps the twisted pair 10.

(Configuration of the Jacket 50)

The jacket 50 is made of the insulated material and covers the film-shaped shield 30. The jacket 50 serves as physical protection for the shielding body 40 containing the film-shaped shield 30, and the braided shield 20 and the twisted pair 10 located inside the shielding body 40.

The insulated material constituting the jacket 50 consists mainly of the polymer material, which can be any polymer material. Specific examples of the polymer materials can include polyolefins such as polyethylene and polypropylene, polyvinyl chloride, polystyrene, polytetrafluoroethylene, and polyphenylene sulfide. Further, the jacket 50 may contain additives such as a flame retardant in addition to the polymer material as necessary. The polymer material constituting the jacket 50 may be foamed or crosslinked. The polymer material constituting the jacket 50 may be the same or different type from the polymer material constituting the insulation covering 13. From the viewpoint of simplifying the construction and reducing manufacturing processes of the entire shielded communication cable 1, it is preferable to use the same type of polymer material.

As described above, the inner diameter of the jacket 50 is 3.5 mm or smaller. The inner surface of the jacket 50 is in contact with the outer surface of the film-shaped shield 30 either directly or through the thin layer of the adhesive, and the smaller the inner diameter D of the jacket 50, the smaller the outer diameter of the cylindrical shape formed by the film-shaped shield 30 becomes. When the cylindrical shape formed by the film-shaped shield 30 is bent in the axis direction with the same radius of curvature, the larger the outer diameter of the cylindrical body, the greater strain applied to the film-shaped shield 30. Therefore, the smaller the inner diameter D of the jacket 50, the smaller the strain applied to the film-shaped shield 30 when the shield communication cable 1 bent, and the less the film-shaped shield 30 may be damaged such as breakage by the load associated with the strain.

As explained in next example, when the inner diameter D of the jacket 50 is 3.5 mm or smaller, damage to the film-shaped shield 30 can be effectively prevented when the shielded communication cable is bent. In particular, when the film-shaped shied 30 consists of the composite of the metal film 32 and the base material 31 made of other materials, such as the polymer-metal composite film 30A, damage such as breakage to the layer of the film-shaped shield 30 can be effectively prevented. If damage occurs to the film-shaped shield 30, the noise shielding properties of the film-shaped shield 30 are likely to be impaired easily. However, if the inner diameter D of the jacket 50 is 3.5 mm or smaller, the noise shielding properties derived from the shielding body 40 including the film-shaped shield 30 can be maintained at a high level even after the shielded communication cable 1 is bent.

In the present embodiment, the film-shaped shield 30 is longitudinally placed, and thus it is easily strained when the shielded communication cable 1 is bent compared with the film-shaped shield 30 served arrangement. However, by suppressing the inner diameter of the jacket 50 to 3.5 mm or smaller, although the film-shaped shield 30 is longitudinally placed, it is possible to sufficiently prevent the film-shaped shield 30 from being damaged when the shielded communication cable 1 is bent.

From the viewpoint of sufficiently preventing the damage to the film-shaped shield 30 in bending, it is more preferable that the inner diameter D of the jacket 50 is 3.0 mm or smaller. On the other hand, from the viewpoint of the characteristics of the shielded communication cable 1, the lower limit of the inner diameter D of the jacket 50 is not particularly provided. However, considering the outer diameter of the twisted pair 10 influencing on the characteristic impedance of 100±5Ω, the inner diameter D of the jacket 50 should be substantially 2.2 mm or larger where the braided shield 20 and the film-shaped shield 30 covers the twisted pair 10 having such outer diameter and the jacket 50 further covers the braided shield 20 and the film-shaped shield 30. Meanwhile, the inner diameter D of the jacket 50 can be measured and evaluated after the shielded communication cable 1 should be cut substantially orthogonal in the axis direction in a state which the shielded communication cable 1 should be embedded in an acrylic resin to prepare a cross-sectional sample.

The thickness of the jacket 50 is not particularly limited as long as the inner diameter D of the jacket is 3.5 mm or smaller, and the thickness of the jacket 50 may be provided considering the protective performance, etc., as appropriate. For example, from the viewpoint of obtaining the sufficient protective performance, the thickness of the jacket 50 may be 0.2 mm or larger, or even more 0.4 mm or larger, while from the viewpoint of avoiding excessive increase of the diameter of the shielded communication cable 1, the thickness of the jacket 50 may be 1.0 mm or smaller. Furthermore, from the viewpoint of the simple configuration, the jacket 50 should preferably be made of one layer of insulating material, but may be made of multiple layers.

The jacket 50 is preferably adhered to the outer surface of the film-shaped shield 30. In particular, as the film-shaped shield 30 shown in FIG. 2, the polymer-metal film 30 A preferably having the metal film 32 on one side and the adhesive layer 33 on the other side as the film-shaped shield 30 is preferably placed with the side of the metal film 32 facing inside, and it is preferable that the jacket 50 is contact to the film-shaped shield 30 via the adhesive layer 33.

By adhering the film-shaped shield 30 placed longitudinally to the jacket 50, the film-shaped shield 30 and the jacket 50 can be removed in a single step, providing high processability in processing the terminal of the shielded communication cable 1. For example, when a slit from the outside of the jacket 50 to the film-shaped shield 30 is formed, and a force to shift the jacket 50 in the direction along the axis of the shielded communication cable 1 is only applied, both the jacket 50 and the film-shaped shield 30 can be removed in a single step and the braided shield 20 is exposed from the terminal of the shielded communication cable 1. Therefore, in the shielded communication cable 1, when the jacket 50 is formed and directly covers the braided shield 20 without using film-shaped shield 30, the same operation as removing the jacket 50 to expose the braided shield 20 can be used to remove the film-shaped shield 30. Furthermore, it may be useful in automatic processing of the terminal.

The jacket 50 may be formed by extrusion molding. The extrusion molding of the jacket 50 can be carried out continuously and simultaneously as a single process with the longitudinal arrangement of the film-shaped shield 30. Furthermore, adhering between the film-shaped shield 30 and the jacket 50 can be performed at the same time of the molding. For example, when the adhesive layer 33 on the film-shaped shield 30 consisting of the polymer-metal composite film 30 A is made of a thermoplastic adhesive, adhesion can be achieved by heat generated by extrusion molding of the jacket 50. Thus, compared with the case where the jacket 50 directly covers the braided shield 20 without using the film-shaped shield 30 as in the case with conventional shielded communication cable, in the shielded communication cable 1, the longitudinally placed film-shaped shield 30 can be installed and be adhered to the jacket 50 without increasing the number of the process.

(Property of the Shielded Communication Cable)

As mentioned above, the shielded communication cable 1 according to the present embodiment has two types of the shielding materials as the shielding body 40: a braided shield 20 and the longitudinally placed film-shaped shield 30 which are stacked in this order from the inside. As a result, the shielded communication cable 1 can have the high performance of noise shielding.

Furthermore, damage such as brakeage to the film-shaped shield 30 can be effectively prevented even if the film-shaped shield 30 is placed longitudinally and is prone to be subjected to distortion in bending, since the inner diameter D of the jacket 50 covering the film-shaped shield 30 is suppressed to 3.5 mm or smaller. As a result, after bending of the shielded communication cable 1, the shielded communication cable 1 can assure high performance of noise shielding provided by the shielding body 40 including the film-shaped shield 30.

Furthermore, the shielded communication cable 1 according to the present embodiment can have more excellent flexibility in bending in each direction and more excellent bending resistance in terms of maintaining transmission characteristics in bending than the pair of insulated wires disposed in parallel since the signal line is in the form of the twisted pair 10 having the pair of insulated wires 11, 11 twisted with each other. In particular, the twist pitch of the twisted pair 10 is 30 times of the outer diameter of the insulated wire 11 or smaller, and thus the shielded communication cable 1 shows excellence in maintaining transmission characteristics such as characteristic impedance.

In the shielded communication cable 1, in order to keep the inner diameter D of the jacket 50 small, it is effective to reduce the diameter of the insulated wire 11 constituting the twisted pair 10, however, the thinner the insulation covering 13 is, the lower the characteristic impedance becomes. Then it becomes difficult to ensure the characteristic impedance required of the shielded communication cable 1. However, by keeping the relative dielectric constant of the insulation covering 13 at 2.5 or lower, the thickness of the insulation covering 13 can be reduced enough to allow the outer diameter of the insulated wire 11 to be 1.5 mm or smaller, with the characteristic impedance maintained in the range of 100±5Ω), which is required for the shielded cable for Ethernet communication. Therefore, the diameter of the whole twisted pair 10 can be reduced and the inner diameter D of the jacket 50 can be easily kept 3.5 mm or smaller. Reducing the diameter of the insulated wire 11 is even easier to achieve by reducing the diameter of the conductor 12, and therefore the conductor cross-sectional area is preferably 0.22 $mm^2$ or smaller.

Thus, in the shielded communication cable 1, by using the relative dielectric constant of the insulation covering 13 and the twist pitch of the twisted pair 10 defined below the required upper limit and limiting the inner diameter D of the jacket 50, the shielded communication cable 1 can ensure the characteristic impedance of 100±5Ω and excellent performance of bending resistance. In other words, it can be easier to bend the shielded communication cable 1 flexibly in each direction, and it is possible to prevent noise shielding properties from decreasing or the characteristic impedance from deviating from the required range upon bending of the shielded communication cable 1. Furthermore, if the shielded communication cable 1 is repeatedly bent, the shielded communication cable 1 can keep such the high performance of bending resistance. Since the shielded communication cable 1 has the high performance of bending resistance, it can be used suitably in automobiles. The shielded communication cable 1 is often subjected to bending with a small bending radius when it is placed in a limited space in automobiles. In particular, when the shielded communication cable 1 is placed on a moving component such as a door of a vehicle, it will be repeatedly bent. Therefore, even when the shielded communication cable 1 is bent with the small bending radius or is repeatedly bent, the shielded communication cable 1 having a high performance of bending resistance enables to reduce the load in bending and easily maintains the required properties stably including the characteristic impedance and noise shielding properties over a long period of time.

Example

A description of the present invention will now be specifically provided with reference to examples; however, the present invention is not limited to the examples. For the examples, evaluations were performed in the air at room temperature unless otherwise specified.

(Preparation of Samples)

(1) Preparation of Conductor

A conductor to be contained in the insulated wires was prepared. Specifically, an electrolytic copper of a purity of 99.99% or higher and master alloys containing Fe, P, and Sn were charged in a melting pot made of a high-purity carbon, and were vacuum-melted in the continuous casting machine to provide a mixed molten metal containing 0.61 mass % of Fe, 0.12 mass % of P and 0.26 mass % of Sn. The mixed molten metal was continuously cast into a cast product of φ 12.5 mm. The cast product was subjected to extrusion and rolling to have a diameter of φ 8 mm, and then was drawn to provide an elemental wire of φ 0.165 mm, φ 0.215 mm, or φ 0.265 mm. Seven elemental wires as produced were stranded with a stranding pitch of 14 mm, and then the stranded wire was compressed. The conductor cross-sectional area and the outer diameter of the conductors are shown in Table 1. Then the compressed conductor was subjected to a heat treatment where the temperature of the wire was kept at 480° C. for four hours. Thus, the conductor after the heat treatment had a breaking elongation of 7%.

(2) Preparation of Insulated Wire

Insulated wires for Samples were prepared by formation of insulation coverings around the above-prepared copper alloy conductors through extrusion. As the materials of the insulation coverings, polypropylene (PP) having the relative dielectric constant of 2.5 or polyvinyl chloride (PVC) having the relative dielectric constant of 3.6 was used. The thickness of the insulation coverings was varied for each sample, and the thickness of the insulation covering and the outer diameter of the resulting insulated wires are shown in Table 1 below.

(3) Preparation of Shielded Communication Cable

Two insulated wires of the same type as prepared above were twisted with each other with a twist pitch shown in Table 1, to provide the twisted pairs. At this time, no twisting was applied to the insulated wires that made up the twisted pairs.

Then, braided shields were put directly surrounding the prepared twisted pairs. The braided shields made of tin-plated annealed copper wires of φ 0.12 mm (i.e., 0.12TA) was used with the number of carriers of 12, number of wires per carrier of eight, and pitch of 20 mm.

Then, a film-shaped shield directly covered the braided shield. As the film-shaped shield, a PET film with an aluminum film on one side (Al-PET) was used. The other side of the PET film was provided with an adhesive layer. The thickness of the entire film-shaped shield was 0.05 mm, and the thickness of the aluminum film was 15 μm. The film-shaped shield longitudinally lapped the twisted pair with the aluminum film side in contact with the outer surface of the braided shield.

The jacket was formed at the same time as the film-shaped shield was placed. The jacket was prepared by formation of polypropylene resin around the film-shaped shield through extrusion molding. The thickness of the jacket was 0.4 mm. The shielded communication cables as Samples were thus prepared. Table 1 below shows the inner diameter of the jacket and the overall outer diameter (finished outer diameter) of the prepared shielded communication cables. The inner diameter of the jacket was measured in cross-section by cutting the shielded communication cables orthogonal to the axial direction.

[Evaluation]

(Number of Bending Until Shield Breakage)

For each shielded communication cable, a bending test was conducted to determine the number of bends until a breakage occurred in the braided shield or film-shaped shield. The bending test was conducted with a bending radius (R) of 30 mm, a bending angle of ±90°, and a load of 3.9 N applied. After performing the bending with a unit of 100 times, the jacket at the bend point was removed, and the state of the film-shaped shield and braided shield inside was visually observed to check for any breakage. The number of bends until the breakage occurred in at least one of the film-shaped shield or the braided shield was recorded.

(Characteristic Impedance)

The characteristic impedance of each shielded communication cable was measured in its initial state before bending was applied. The measurements were performed using a network analyzer and the Time Domain Reflectometry (TDR) method.

Then, each shielded communication cable was subjected to 500 bends under the same conditions as those for the evaluation of the number of bending until shield breakage described above. Afterwards, the characteristic impedance was measured in the same way as in the initial condition.

[Result]

Table 1 shows the configuration of each part and the evaluation results for samples 1 to 15, in which the configuration of each part of the shielded communication cable was changed. The twist pitch of the twisted pair is shown both as an absolute value in mm and as a multiple value with respect to the outer diameter of the insulated wire.

In the evaluation of the number of bends until the shield breaks (the number of bending for shield-breaking), the breakage of the film-shaped shield occurred in fewer bends than the breakage of the braided shield for all samples. The number of bends at which the breakage of the film-shaped shield was observed is shown in the table. Furthermore, in addition to the number of shield-breaking bends and the measured values of characteristic impedance before and after the bends, the table shows the results of evaluation regarding the characteristics of shielded communication cables. When the number of shield-breaking bends was 5,000 or more, and the characteristic impedance was within the range of 100±5Ω) before and after the bends, the sample was evaluated as with high characteristics. On the other hand, when the number of shield-breaking bends did not reach 5,000, or when the characteristic impedance was out of the range of 100±5Ω at least either before and after bending, or when the sample was in both of these conditions, the sample was evaluated as with low characteristics.

TABLE 1

| | Insulated Wire | | | | | | | | | | Number of | Characteristic Inpedance | | |
|---|---|---|---|---|---|---|---|---|---|---|---|---|---|---|
| | Conductor | | Insulation Covering | | | | | | | | | | | |
| Sample No. | Cross-Sectional Area [$mm^2$] | Outer Diameter [mm] | Material | Relative Dielectric Constant | Thickness [mm] | Outer Diameter [mm] | Twitch Pitch [mm] | Twitch Pitch [times] | Inner Diameter of the Jacket [mm] | Finished Outer Diameter [mm] | Bending for Shield-Breaking [times] | Before Bending [Ω] | After 500 times Bending [Ω] | Evalutation of Character-ization |
| 1 | 0.13 | 0.45 | PP | 2.5 | 0.38 | 1.21 | 20 | 17 | 2.92 | 3.7 | 8600 | 100 | 100 | A |
| 2 | 0.13 | 0.45 | PP | 2.5 | 0.36 | 1.17 | 20 | 17 | 2.84 | 3.6 | 8900 | 95 | 95 | A |
| 3 | 0.13 | 0.45 | PP | 2.5 | 0.42 | 1.29 | 20 | 16 | 3.08 | 3.9 | 7100 | 104 | 104 | A |
| 4 | 0.13 | 0.45 | PP | 2.5 | 0.38 | 1.21 | 25 | 21 | 2.92 | 3.7 | 8700 | 99 | 100 | A |
| 5 | 0.13 | 0.45 | PP | 2.5 | 0.38 | 1.21 | 30 | 25 | 2.92 | 3.7 | 8600 | 100 | 101 | A |
| 6 | 0.13 | 0.45 | PP | 2.5 | 0.38 | 1.21 | 35 | 29 | 2.92 | 3.7 | 8700 | 100 | 104 | A |
| 7 | 0.13 | 0.45 | PP | 2.5 | 0.38 | 1.21 | 40 | 33 | 2.92 | 3.7 | 8700 | 100 | 106 | B |
| 8 | 0.22 | 0.55 | PP | 2.5 | 0.44 | 1.43 | 20 | 14 | 3.36 | 4.2 | 6200 | 100 | 100 | A |
| 9 | 0.22 | 0.55 | PP | 2.5 | 0.475 | 1.50 | 20 | 13 | 3.50 | 4.3 | 5800 | 95 | 96 | A |
| 10 | 0.35 | 0.70 | PP | 2.5 | 0.40 | 1.50 | 20 | 13 | 3.50 | 4.3 | 6000 | 81 | 84 | B |
| 11 | 0.13 | 0.45 | PVC | 3.6 | 0.38 | 1.21 | 20 | 17 | 2.92 | 3.7 | 8800 | 89 | 90 | B |
| 12 | 0.13 | 045 | PVC | 3.6 | 052 | 1.49 | 20 | 13 | 3.48 | 43 | 6000 | 94 | 94 | B |
| 13 | 0.13 | 0.45 | PVC | 3.6 | 0.53 | 1.51 | 20 | 13 | 3.52 | 4.3 | 4600 | 104 | 105 | B |
| 14 | 0.22 | 0.55 | PVC | 3.6 | 0.55 | 1.65 | 20 | 12 | 3.80 | 4.6 | 3200 | 96 | 97 | B |

In Table 1, samples 1 to 10 use polypropylene with the relative dielectric constant of 2.5 as the configuration material of the insulation covering. Among those samples, the thickness of the insulation covering is changed in samples 1 to 3, and as the insulation covering thicker, the value of the characteristic impedance in the initial state was increased. However, all samples 1 to 3 could keep the outer diameter of the insulated wire within 1.5 mm and the characteristic impedance in the range of 100±5Ω. As a result, the inner diameter of the jacket was within 3.5 mm or smaller. When the inner diameter of the jacket could be kept within 3.5 mm, the number of bending until the shields break was 5,000 times or more. In addition, the value of the characteristic impedance did not change before and after 500 bending. Therefore, when the material with the relative dielectric constant of 2.5 or less is used in the shielded communication cable, the shielded communication cable can have the high performance of bending resistance and can maintain the characteristic impedance of 100±5Ω, and thus the shielded communication cable can have the high properties.

Furthermore, in Samples 1 and 4 to 7, the twist pitch of the twisted pair wires was changed. The number of bending for shield-breaking and the characteristic impedance in the initial state were almost constant regardless of the twist pitch, but the characteristic impedance after bending became higher as the twist pitch became larger. In samples 1 and 4 to 6, where the twist pitch was 30 times of the outer diameter of the insulated wire or smaller, the characteristic impedance was in the range of 100±5Ω) after bending. On the other hand, in sample 7, where the twist pitch was larger than 30 times the outer diameter of the insulated wire, the characteristic impedance after bending was exceeds the range of 100±5Ω) to a high value. Thus, when the characteristic impedance in the initial state is in the range of 100±5Ω) and the twist pitch is 30 times of the outer diameter of the insulated wire or smaller, it turns out that the twist structure can be maintained stably even through bending of the shielded communication cable, and the characteristic impedance can be in the range of 100±5Ω. If the twist pitch is larger than 30 times of the outer diameter of the insulated wire, the interpretation that the characteristic impedance rises beyond the described above range since the distance between the two insulated wires 11, 11 is increased takes place.

In samples 8 to 10, the diameter of the conductor cross-sectional area was larger than samples 1 to 3 and the diameter of the conductor was enlarged. In all samples 8 to 10, the insulation covering was thickened in an extent that the inner diameter of the jacket could be kept 3.5 mm or smaller. The sample 10 could not have enough thickness of the insulation covering to obtain the characteristic impedance of 100±5Ω as long as the inside diameter of the jacket can be preserved below 3.5 mm since the conductor cross-sectional area was too large. However, samples 8 and 9 could keep the inner diameter of the jacket to be 3.5 mm or smaller and form the insulation covering having enough thickness to obtain the characteristic impedance in the range of 100±5Ω) although the characteristic impedance of samples 8 and 9 was lower than those of samples 1 to 3. Moreover, even after bending, the characteristic impedance could be kept in the range of 100±5Ω.

In Samples 11 to 14, a polyvinyl chloride with a relative dielectric constant of more than 2.5 was used as the configuration material of the insulation covering. Sample 11 had the same configuration with sample 1 except for the configuration material of the insulation covering. However, the characteristic impedance was lower from the initial state than in the case of sample 1 and did not reach the range of 100±5Ω because the relative dielectric constant of the insulation covering was high.

The thickness of the insulation covering was increased in the order from sample 11 to sample 14, however, the characteristic impedance did not reach 100±5Ω in the initial state of samples 11 and 12 where the insulation covering was formed in an extent that the thickness of the insulation covering became 3.5 mm or smaller. On the other hand, in samples 13 and 14, where the inner diameter of the jacket was allowed to be larger than 3.5 mm, the samples 13 and 14 could have the thick insulation covering and the characteristic impedance of 100±5Ω in the initial state, since the diameter of the insulated wire could be enlarged. However, due to the inner diameter of the jacket exceeding 3.5 mm, a large load was applied to the film-shaped shield when the shielded communication cable was bent, and the film-shaped shield broke before reaching 5,000 times of bending. As described above, when the material with the relative dielectric constant more than 2.5 is used as the insulation covering in the shielded communication cable, it is not possible to secure the characteristic impedance in the range of 100±5Ω) and keep the inner diameter of the jacket to be 3.5 mm or smaller, and then it is not possible to ensure both characteristic impedance and bending resistance. In other words, if the material with the relative dielectric constant more than 2.5 is used as the insulation covering, it is not possible to obtain the shielded communication cable with sufficient characteristics.

From the results of the characteristic evaluation of each sample, when the material with the relative dielectric constant of 2.5 or less is used as the insulation covering of the insulated wire, it turns out that the shielded communication cable can have the characteristic impedance in the range of 100±5Ω) and the inner diameter of the jacket kept 3.5 mm or smaller. Furthermore, in the initial state before bending, when the characteristic impedance is in the range of 100±5Ω) and the inner diameter of the jacket is 3.5 mm or smaller, damage to the film-shaped shield can be prevented and the characteristic impedance of 100±5Ω can be kept after bending if the twist pitch is 30 times of the outer diameter or smaller. Therefore, the shielded communication cable can have the excellent performance of bending resistance.

The embodiments of the present invention have been described specifically but the present invention is no way restricted to the embodiments described above but can be modified variously within a range not departing from the gist of the present invention.

DESCRIPTION OF REFERENCE NUMERALS

1 Shielded communication cable
10 Twisted pair
11 Insulated wire
12 Conductor
13 Insulation Covering
20 Braided shield
30 Film-shaped shield
30*a* Polymer-metal composite film
31 Polymer film
32 Metal film
33 Adhesive layer
40 Shielding body
50 Jacket
D Inner diameter of the Jacket

The invention claimed is:

1. A shielded communication cable, comprising:

a pair of insulated wires twisted with each other, each of the insulated wires comprising:

a conductor; and an insulation covering which covers the conductor and has a relative dielectric constant of 2.5 or lower;

a braided shield which is made of metal elemental wires and covers the pair of insulated wires by directly contacting an outer surface of the twisted insulated wires without any tape or other material between the braided shield and the outer surface of the twisted insulated wires;

a film-shaped shield which comprises a metal film and longitudinally laps the pair of insulated wires over the braided shield; and a jacket having an inner diameter of 3.5 mm or smaller which covers the film-shaped shield, the pair of insulated wires twisted with each other with a twist pitch of 25 times of an outer diameter of each of the insulated wires or smaller, the shielded communication cable having a characteristic impedance of 100±5Ω.

2. The shielded communication cable according to claim 1, wherein each of the insulated wires has an outer diameter of 1.5 mm or smaller.

3. The shielded communication cable according to claim 2, wherein each of the insulated wires has a conductor cross-sectional area of 0.22 $mm^2$ or smaller.

4. The shielded communication cable according to claim 3, wherein each of the insulated wires has a conductor cross-sectional area of 0.13 $mm^2$ or larger.

5. The shielded communication cable according to claim 4, wherein the film-shaped shield has a composite structure in which the polymer film and the metal film are stacked with each other.

6. The shielded communication cable according to claim 5, wherein the jacket is adhered to the film-shaped shield.

7. The shielded communication cable according to claim 1, wherein each of the insulated wires has a conductor cross-sectional area of 0.22 mm2 or smaller.

8. The shielded communication cable according to claim 1, wherein each of the insulated wires has a conductor cross-sectional area of 0.13 mm2 or larger.

9. The shielded communication cable according to claim 1, wherein the film-shaped shield has a composite structure in which the polymer film and the metal film are stacked with each other.

10. The shielded communication cable according to claim 1, wherein the jacket is adhered to the film-shaped shield.

11. The shielded communication cable according to claim 1, wherein the twist pitch is 20 times the outer diameter of the insulated wire or smaller.

* * * * *